United States Patent
Wasselin et al.

(10) Patent No.: US 12,281,960 B2
(45) Date of Patent: Apr. 22, 2025

(54) AIRCRAFT ENGINE MAINTENANCE TESTING

(71) Applicant: RTX Corporation, Farmington, CT (US)

(72) Inventors: David Wasselin, Longmeadow, MA (US); Rose A. Wasselin, Longmeadow, MA (US)

(73) Assignee: RTX CORPORATION, Farmington, CT (US)

( * ) Notice: Subject to any disclaimer, the term of this patent is extended or adjusted under 35 U.S.C. 154(b) by 305 days.

(21) Appl. No.: 17/860,814

(22) Filed: Jul. 8, 2022

(65) Prior Publication Data

US 2024/0011869 A1   Jan. 11, 2024

(51) Int. Cl.
   *G01M 15/14*   (2006.01)
   *F01D 21/00*   (2006.01)

(52) U.S. Cl.
   CPC .......... *G01M 15/14* (2013.01); *F01D 21/003* (2013.01); *F05D 2220/32* (2013.01); *F05D 2260/83* (2013.01)

(58) Field of Classification Search
   CPC ... G01M 15/14; F05D 2260/83; F01D 21/003
   See application file for complete search history.

(56) References Cited

U.S. PATENT DOCUMENTS

| | | | | |
|---|---|---|---|---|
| 5,023,791 A * | 6/1991 | Herzberg | ........... | G05B 23/0283 324/73.1 |
| 5,444,861 A * | 8/1995 | Adamec | ................ | G06F 15/177 713/100 |
| 10,807,738 B2 | 10/2020 | Dauenhauer et al. | | |
| 10,977,877 B2 | 4/2021 | Scheid et al. | | |
| 2004/0056766 A1 * | 3/2004 | Butz | ........................ | F02C 9/00 701/1 |
| 2008/0009983 A1 * | 1/2008 | Mottura | ............... | G05D 1/0055 714/E11.166 |
| 2013/0166135 A1 * | 6/2013 | Dunsdon | .............. | G07C 5/0808 701/29.3 |
| 2013/0332011 A1 * | 12/2013 | Ziarno | ............... | H04B 7/18506 701/3 |
| 2015/0362405 A1 * | 12/2015 | Bowler | ................. | G01M 15/14 415/118 |

(Continued)

FOREIGN PATENT DOCUMENTS

CN   105278344 A   *   1/2016
CN   105739488 A        7/2016

*Primary Examiner* — Topaz L. Elliott

(74) *Attorney, Agent, or Firm* — CANTOR COLBURN LLP

(57) ABSTRACT

Examples described herein provide a method for aircraft engine maintenance testing for an engine of an aircraft. The method includes causing, by an aircraft maintenance computer, a full authority digital engine control to enter a test mode. The method further includes loading, via the aircraft maintenance computer, a script to the full authority digital engine control, the script defining a specific maintenance test sequence. The method further includes performing, by the full authority digital engine control, the specific maintenance test sequence. The method further includes implementing a corrective action to correct a defect detected by the specific maintenance test sequence.

20 Claims, 5 Drawing Sheets

(56) References Cited

U.S. PATENT DOCUMENTS

| | | | | |
|---|---|---|---|---|
| 2016/0171796 | A1* | 6/2016 | Volponi | G06F 16/245 |
| | | | | 701/14 |
| 2018/0306052 | A1* | 10/2018 | Lammers | F01D 17/08 |
| 2021/0096970 | A1* | 4/2021 | Gilton | G06F 11/3672 |
| 2021/0152237 | A1* | 5/2021 | King | H04W 88/06 |
| 2022/0123957 | A1* | 4/2022 | Gilton | H04L 12/40 |
| 2022/0349353 | A1* | 11/2022 | Scheid | G06F 9/4881 |
| 2022/0371738 | A1* | 11/2022 | Shinde | F01D 11/14 |
| 2023/0259348 | A1* | 8/2023 | Berdah | G06F 8/65 |
| | | | | 717/168 |

* cited by examiner

AIRCRAFT ENGINE MAINTENANCE TESTING

TECHNICAL FIELD

The subject matter disclosed herein generally relates to aircraft engines and particularly to aircraft engine maintenance testing.

BACKGROUND

Gas turbine engines require maintenance at various points throughout their useful life. In some cases, maintenance can be performed at predefined intervals depending on engine parameters, estimated lifetime of components, and the like. In other cases, maintenance is performed upon the occurrence of an event, such as a failure of a component. Maintenance can include testing one or more components/systems of the aircraft, including the aircraft's gas turbine engines. Some testing can be performed "in-service" (e.g., while the aircraft is operational).

BRIEF DESCRIPTION

In one exemplary embodiment, a method for aircraft engine maintenance testing for an engine of an aircraft is provided. The method includes causing, by an aircraft maintenance computer, a full authority digital engine control to enter a test mode. The method further includes loading, via the aircraft maintenance computer, a script to the full authority digital engine control, the script defining a specific maintenance test sequence. The method further includes performing, by the full authority digital engine control, the specific maintenance test sequence. The method further includes implementing a corrective action to correct a defect detected by the specific maintenance test sequence.

In addition to one or more of the features described herein, or as an alternative, further embodiments of the method may include that the specific maintenance test sequence is an on ground specific maintenance test sequence.

In addition to one or more of the features described herein, or as an alternative, further embodiments of the method may include that performing the on ground specific maintenance test sequence includes: performing the on ground specific maintenance test sequence responsive to an engine on event; recording, storing, and transmitting data for the on ground specific maintenance test sequence; and deleting the on ground specific maintenance test sequence subsequent to performing the on ground specific maintenance test sequence.

In addition to one or more of the features described herein, or as an alternative, further embodiments of the method may include that the specific maintenance test sequence is an in air specific maintenance test sequence.

In addition to one or more of the features described herein, or as an alternative, further embodiments of the method may include that performing the in air specific maintenance test sequence includes: performing the in air specific maintenance test sequence responsive to the aircraft being at a specified condition; recording, storing, and transmitting data for the in air specific maintenance test sequence; and deleting the on ground specific maintenance test sequence subsequent to performing the in air specific maintenance test sequence.

In addition to one or more of the features described herein, or as an alternative, further embodiments of the method may include that the specific maintenance test sequence is an update data record list specific maintenance test sequence.

In addition to one or more of the features described herein, or as an alternative, further embodiments of the method may include that performing the update data record list specific maintenance test sequence comprises updating a data record list and a parameter transmit list.

In addition to one or more of the features described herein, or as an alternative, further embodiments of the method may include that performing, by the full authority digital engine control, the specific maintenance test sequence is based at least in part on a location within a memory in which the specific maintenance test sequence is stored.

In addition to one or more of the features described herein, or as an alternative, further embodiments of the method may include that the engine is a gas turbine engine.

In another exemplary embodiment a full authority digital control includes a memory comprising computer readable instructions and a processing device for executing the computer readable instructions. The computer readable instructions control the processing device to perform operations for aircraft engine maintenance testing for an engine of an aircraft. The operations include entering a test mode responsive to a command from an aircraft maintenance computer. The operations further include loading, via the aircraft maintenance computer, a script to the memory, the script defining a specific maintenance test sequence. The operations further include performing the specific maintenance test sequence. The operations further include causing a corrective action to be implemented to correct a defect detected by the specific maintenance test sequence.

In addition to one or more of the features described herein, or as an alternative, further embodiments of the full authority digital engine control may include that the specific maintenance test sequence is an on ground specific maintenance test sequence.

In addition to one or more of the features described herein, or as an alternative, further embodiments of the full authority digital engine control may include that performing the on ground specific maintenance test sequence comprises: performing the on ground specific maintenance test sequence responsive to an engine on event; recording, storing, and transmitting data for the on ground specific maintenance test sequence; and deleting the on ground specific maintenance test sequence subsequent to performing the on ground specific maintenance test sequence.

In addition to one or more of the features described herein, or as an alternative, further embodiments of the full authority digital engine control may include that the specific maintenance test sequence is an in air specific maintenance test sequence.

In addition to one or more of the features described herein, or as an alternative, further embodiments of the full authority digital engine control may include that performing the in air specific maintenance test sequence includes: performing the in air specific maintenance test sequence responsive to the aircraft being at a specified condition; recording, storing, and transmitting data for the in air specific maintenance test sequence; and deleting the on ground specific maintenance test sequence subsequent to performing the in air specific maintenance test sequence.

In addition to one or more of the features described herein, or as an alternative, further embodiments of the full authority digital engine control may include that the specific maintenance test sequence is an update data record list specific maintenance test sequence.

In addition to one or more of the features described herein, or as an alternative, further embodiments of the full authority digital engine control may include that performing the update data record list specific maintenance test sequence comprises updating a data record list and a parameter transmit list.

In addition to one or more of the features described herein, or as an alternative, further embodiments of the full authority digital engine control may include that performing the specific maintenance test sequence is based at least in part on a location within the memory in which the specific maintenance test sequence is stored.

In addition to one or more of the features described herein, or as an alternative, further embodiments of the full authority digital engine control may include that the engine is a gas turbine engine.

In yet another exemplary embodiment a computer program product is provided. The computer program product includes a computer readable storage medium having program instructions embodied therewith, the program instructions executable by a processor to cause the processor to perform operations for aircraft engine maintenance testing for an engine of an aircraft. The operations include entering a test mode responsive to a command from an aircraft maintenance computer. The operations further include loading, via the aircraft maintenance computer, a script to the memory, the script defining a specific maintenance test sequence. The operations further include performing the specific maintenance test sequence. The operations further include causing a corrective action to be implemented to correct a defect detected by the specific maintenance test sequence.

In addition to one or more of the features described herein, or as an alternative, further embodiments of the computer program product may include, that performing, by the full authority digital engine control, the specific maintenance test sequence is based at least in part on a location within a memory in which the specific maintenance test sequence is stored.

The above features and advantages, and other features and advantages, of the disclosure are readily apparent from the following detailed description when taken in connection with the accompanying drawings.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
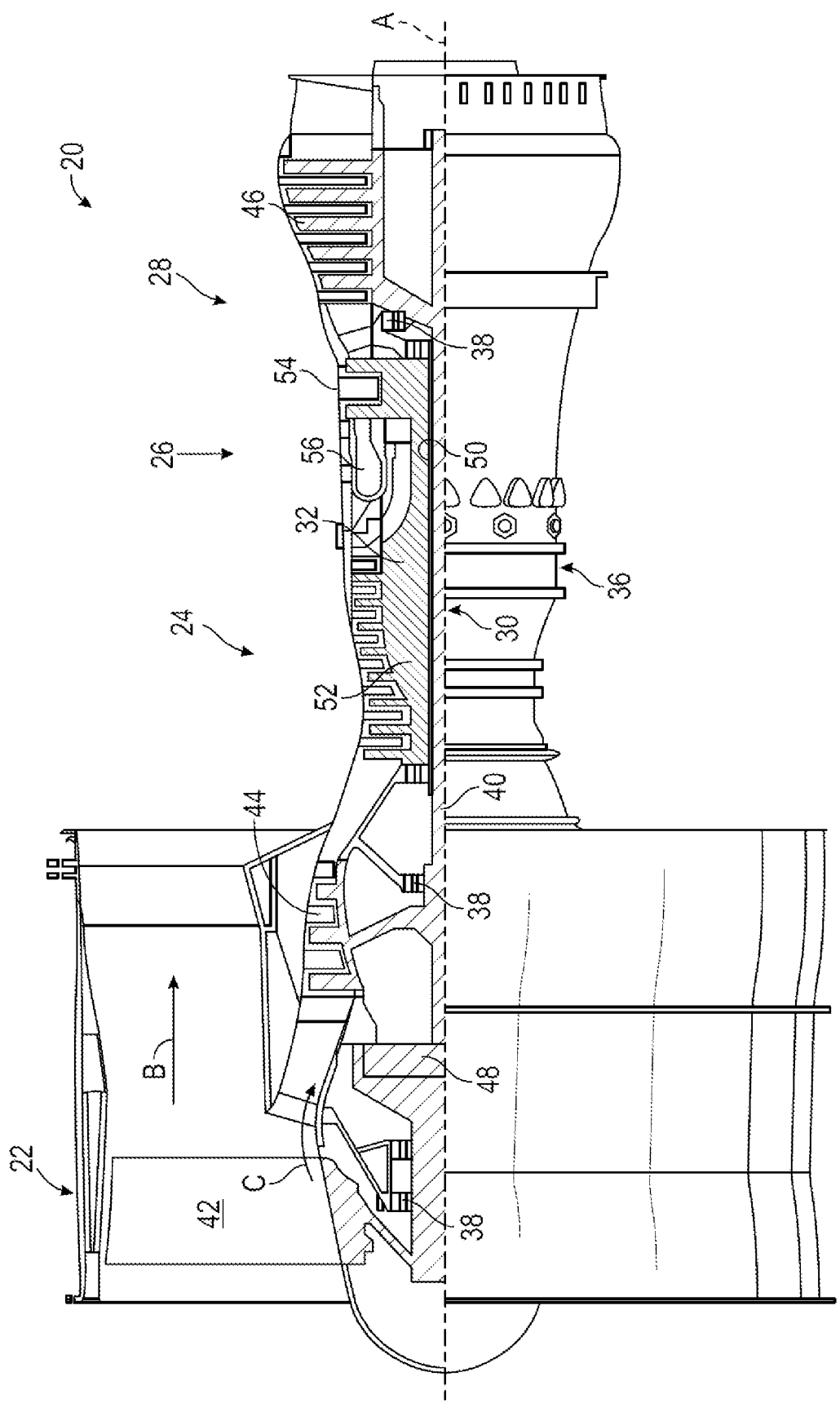
FIG. 1 is a partial cross-sectional illustration of a gas turbine engine, in accordance with an embodiment of the disclosure.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. In some embodiments, stator vanes 45 in the low pressure compressor 44 and stator vanes 55 in the high pressure compressor 52 may be adjustable during operation of the gas turbine engine 20 to support various operating conditions. In other embodiments, the stator vanes 45, 55 may be held in a fixed position. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram } ° \text{R})/(518.7° \text{R})]^{0.5}$. The "Low corrected fan tip speed" as disclosed herein according to one non-limiting embodiment is less than about 1150 ft/second (350.5 m/sec).

While the example of FIG. 1 illustrates one example of the gas turbine engine 20, it will be understood that any number of spools, inclusion or omission of the gear system 48, and/or other elements and subsystems are contemplated. Further, rotor systems described herein can be used in a variety of applications and need not be limited to gas turbine engines for aircraft applications. For example, rotor systems can be included in power generation systems, which may be ground-based as a fixed position or mobile system, and other such applications.

Figure 2:
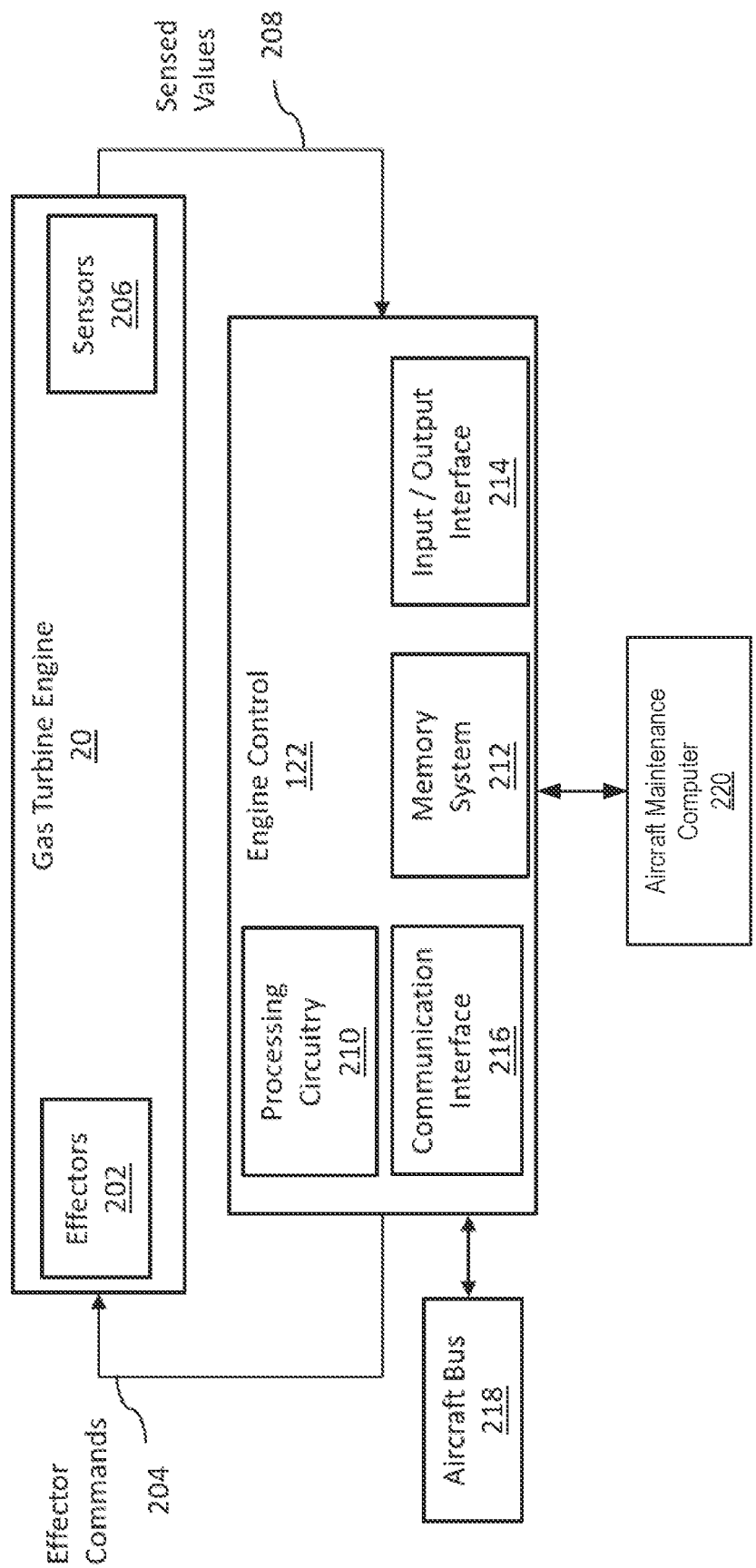
FIG. 2 is a block diagram of an example of an engine control configured to monitor and control operation of a gas turbine engine in real-time (or near-real time) according to one or more embodiments described herein.

FIG. 2 depicts an example of an engine control 122 configured to monitor and control operation of a gas turbine engine (e.g., the gas turbine engine 20) in real-time (or near-real time) according to one or more embodiments described herein. The engine control 122 can control effectors 202 of the gas turbine engine 20 by generating one or more effector commands 204. Examples of effectors 202 can include one or more motors, solenoids, valves, relays, pumps, heaters, and/or other such actuation control components. A plurality of sensors 206 can capture state data associated with the gas turbine engine 20 and provide sensed values 208 as feedback to the engine control 122 to enable closed-loop control of the gas turbine engine 20 according to one or more control laws. Examples of the sensors 206 can include one or more temperature sensors, pressure sensors, strain gauges, speed sensors, accelerometers, lube sensors, and the like.

The engine control 122 (also referred to as a "controller") can be a full authority digital engine control (FADEC) that includes processing circuitry 210 (also referred to as a "processing device") and a memory system 212 (also referred to as a "memory") configured to store a plurality of configuration items, where at least one of the configuration items includes a sequence of the computer executable instructions for execution by the processing circuitry 210. Other types of configuration items can include data, such as constants, configurable data, and/or fault data. Examples of computer executable instructions can include boot software, operating system software, and/or application software. The executable instructions may be stored or organized in any manner and at any level of abstraction, such as in connection with controlling and/or monitoring operation of the gas turbine engine 20. The processing circuitry 210 can be any type or combination of central processing unit (CPU), including one or more of: a microprocessor, a digital signal processor (DSP), a microcontroller, an application specific integrated circuit (ASIC), a field programmable gate array (FPGA), or the like. Also, in embodiments, the memory system 212 may include volatile memory, such as random access memory (RAM), and non-volatile memory, such as Flash memory, read only memory (ROM), and/or other electronic, optical, magnetic, or any other computer readable medium onto which is stored data and algorithms in a non-transitory form.

The engine control 122 can also include one or more of an input/output interface 214, a communication interface 216, and/or other elements. The input/output interface 214 can include support circuitry for interfacing with the effectors 202 and sensors 206, such as filters, amplifiers, digital-to-analog converters, analog-to-digital converters, and other such circuits to support digital and/or analog interfaces. Further, the input/output interface 214 can receive or output signals to/from other sources, such as discrete inputs/outputs and/or status signals. The communication interface 216 may communicate with an aircraft bus 218 of an aircraft. The aircraft bus 218 can provide aircraft-level parameters and commands that are used by the engine control 122 to control the gas turbine engine 20 in real-time. The communication interface 216 may also support communication with other components, such as other instances of the engine control 122, storage units, diagnostic units, communication adapters, off-board systems, and the like. For example, the communication interface 216 may support communication with an aircraft maintenance computer 220 to provide for communication between (e.g., transmitting commands/data to and/or receiving commands/data from) the engine control 122 and the aircraft maintenance computer 220.

The aircraft maintenance computer 220 provides for, among other things, performing tests on one or more components and/or systems of an aircraft. In some cases, the engine control 122, either alone or in combination with the aircraft maintenance computer 220 performs the testing. For example, in service where the engine control 122 is a FADEC, the FADEC may have an "interactive mode" that provided for performing predetermined maintenance tests (also referred to as "test sequences"). Examples of such test sequences include, but are not limited to, an igniter test that causes an igniter to spark (e.g., for 30 seconds), an actuator test that performs a dry crank of the gas turbine engine 20 to confirm actuator failure, and/or the like, including combinations and/or multiples thereof. These tests/sequences are designed and incorporated during initial development and deployment of the gas turbine engine 20 by the engine's manufacturer. For example, one or more of these (or other)

test sequences are hard coded and may utilize a complex interface between the FADEC (e.g., the engine control 122) and the aircraft maintenance computer 220 to display a proper screen to a mechanic. When in service happens and a fault cannot be confirmed, a conventional aircraft maintenance computer 220 and/or engine control 122 may not have an option to gather specific data relevant to the fault.

One or more embodiments described herein address these shortcomings by using the aircraft maintenance computer 220 to load a script to the engine control 122 (e.g., FADEC) to cause the engine control 122 to enter a "test mode" and perform a custom test sequence. Examples of such test sequences can include performing an acceleration/deceleration with different rates, performing a dwell thrust at desired level, modifying an internal schedule to provide for diagnosing failures, updating/generating a dedicated list of data to record, saving dedicated data not otherwise available on a digital flight data recorder (DFDR) or data storage unit (DSU) and reporting such data to the aircraft, and/or the like, including combinations and/or multiples thereof.

Figure 3:
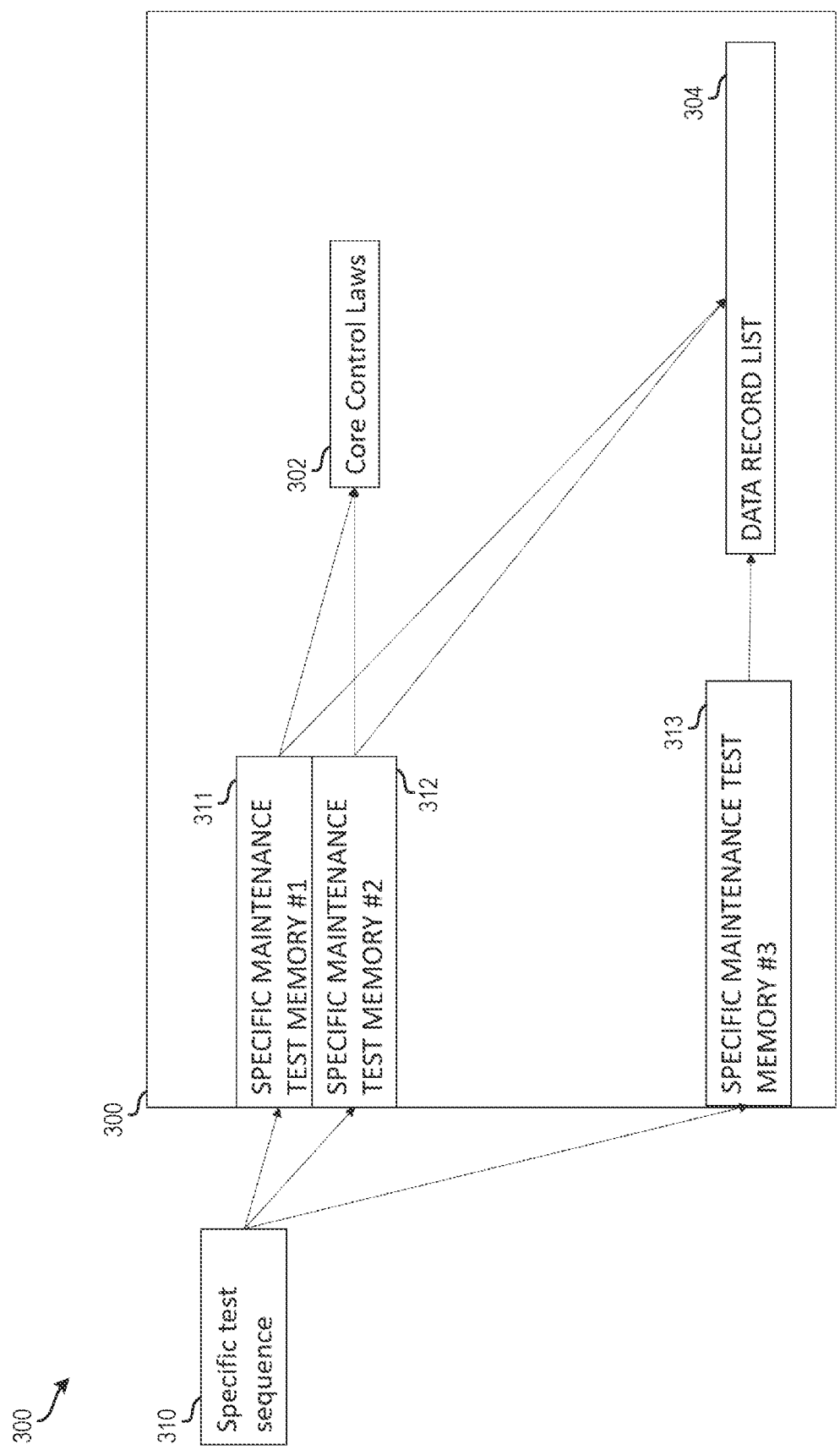
FIG. 3 is a block diagram of a full authority digital engine control for aircraft engine maintenance testing according to one or more embodiments described herein.

FIG. 3 is a block diagram of a FADEC 300 for aircraft engine maintenance testing according to one or more embodiments described herein. The FADEC 300 may be configured similarly to the engine control 122 of FIG. 2 but is not so limited. In the example, the FADEC 300 includes core control laws 302 and a data record list 304. The core control laws 302 are the instructions that the FADEC 300 follows for performing its operations/functions, and the data record list 304 is a list of data/parameters about the gas turbine engine 20 that are recorded, stored, and/or transmitted. In examples, the data record list 304 includes a parameter transmit list, which is a list of parameters transmitted to a remote processing system.

The FADEC 300 also includes memory locations for storing test sequences for aircraft engine maintenance testing. For example, the FADEC 300 includes a specific maintenance test memory #1 location 311, a specific maintenance test memory #2 location 312, and a specific maintenance test memory #3 location 313. The FADEC 300 is configured to receive a specific test sequence 310, which represents a custom test sequence that can be uploaded to the FADEC 300 via the aircraft maintenance computer 220.

One example implementation of a special maintenance test sequence process is described as follows. A technician/engineer defines one or more special maintenance test sequences. The aircraft maintenance computer 220 is set to "test mode" and the test sequence(s) is uploaded to the FADEC 300 via the aircraft maintenance computer 330. In an example, the script can be loaded via a cockpit software loader (A665) or physical device (e.g., PCI Card, USB stick, SD Card). In examples, the uploaded script can be validated using encryption and/or cybersecurity checks to verify that the special maintenance test sequence(s) is authorized and authentic. For script load to be successful, a configuration check can be performed, which can include, for example, confirming a software version and verifying an electronic serial number compared to an identifier (e.g., tail number) of the aircraft.

Further, the script can include a data field that indicates one or more conditions under which the script can be performed. That is, the script defines conditions of the aircraft under which the script can be executed. For example, a script can define that it is to be executed when the aircraft is on the ground. As another example, a script can define that it is to be executed when the aircraft is in the air at a certain airspeed. As yet another example, a script can define that it is to be executed when a throttle of the aircraft is in certain condition (e.g., idle, 50% throttle, etc.). Prior to loading and/or executing the script, the FADEC 300 can check the data field of the script against an actual condition of aircraft (e.g., an operating condition of the engine) and verify that a match exists between the condition defined in the data field of the script and the actual condition of the aircraft. For example, the script is loaded to the memory and/or executed responsive to determining that the actual condition of the aircraft satisfies the condition defined in the data field.

The script is uploaded on the FADEC 300, which can be provided to a technician/engineer through a controlled process. The script can trigger any custom test sequence designed by the engineering team of the engine manufacturer. Examples of scripts can cause one or more of the following specific maintenance test sequences to be performed: performing an acceleration/deceleration with different rates, performing a dwell thrust at desired level, modifying an internal schedule to provide for diagnosing failures, updating/generating a dedicated list of data to record, saving dedicated data not otherwise available on a digital flight data recorder (DFDR) or data storage unit (DSU) and reporting such data to the aircraft (e.g., through a dedicated protocol, such as A665), and/or the like, including combinations and/or multiples thereof. According to one or more embodiments described herein, if the script impacts schedules and/or control laws, the script erased at FADEC reset and/or upon successful completion of the test sequence(s). According to one or more embodiments described herein, if script impacts monitoring function, it may remain active until replaced/removed.

The process of uploading the specific test sequence 310 to the FADEC 300 and using the FADEC 300 to perform the specific test sequence 310 is now described in more detail with reference to FIGS. 4A and 4B. In particular, FIGS. 4A and 4B together are a flow diagram of a method 400 for aircraft engine maintenance testing according to one or more embodiments described herein. As an example, the method 400 can be performed by the engine control 122 of FIG. 2 and/or the FADEC 300 of FIG. 3 to perform maintenance testing of the gas turbine engine 20 of FIG. 1. The method 400 is now described with reference to one or more of the components of FIGS. 1-3 but is not so limited.

At block 402, an aircraft is on the ground (e.g., not in flight), switches for the engine(s) are set to "off," and a maintenance mode is set to "on."

At block 404, the FADEC 300 (e.g., the engine control 122) is powered on.

At block 406, the aircraft maintenance computer 220 loads a script to the engine control 122 (e.g., the FADEC 300). The script is a portion of code that is executable (such as by the FADEC 300) to perform a test sequence (e.g., the specific test sequence 310). The script defines the steps to execute the test sequence, which can be any suitable test or other procedure which can, for example, collect data from one or more sensors, analyze the collected data, and/or transmit the collected data from the FADEC 300 to another system, such as a processing system remote from the FADEC 300. The script can trigger any test sequence designed by an engineering team of a manufacturer of the engine, for example. This enables new (relative to when the engine was manufactured) tests to be defined and implemented. For example, new/different types of data can be collected, analyzed, and transmitted relative to tests that were built into the system when the engine was manufactured. In some examples, the FADEC 300 can perform a verification on the script to verify its authenticity. For example, the script can include a cryptographic key that can be verified by the FADEC 300. According to an example, the FADEC 300 can also verify a condition of the aircraft as compared to a condition defined in the script before loading and/or executing the script as described herein. The script is loaded to one or more of the specific maintenance test memory #1 location 311, the specific maintenance test memory #2 location 312, and/or the specific maintenance test memory #3 location 313. As described herein, the phrase "specific maintenance test memory location" is intended to include any memory location that can be identified or located, such as an addressable location of a memory. All or a portion of the script can be loaded to a memory location depending on what type of test sequence is to be performed. For example, the FADEC 300 stores all or a portion of the specific test sequence 310 relating to an "on ground" test to the specific maintenance test memory #1 location 311, stores all or a portion of the specific test sequence 310 relating to an "in air" test to the specific maintenance test memory #2 location 312, and stores all or a portion of the specific test sequence 310 relating to an "update data record list" test to the specific maintenance test memory #3 location 313.

At block 408, the FADEC 300 determines whether a script (e.g., the specific test sequence 310) is stored in a specific memory location (e.g., one or more of the specific maintenance test memory #1 location 311, the specific maintenance test memory #2 location 312, and/or the specific maintenance test memory #3 location 313). As an example, the specific memory location can include an addressable location of a memory. If at block 408 it is determined that no script is stored in a specific memory location, the method 400 advances to block 410, where the method 400 ends.

Figure 4A:
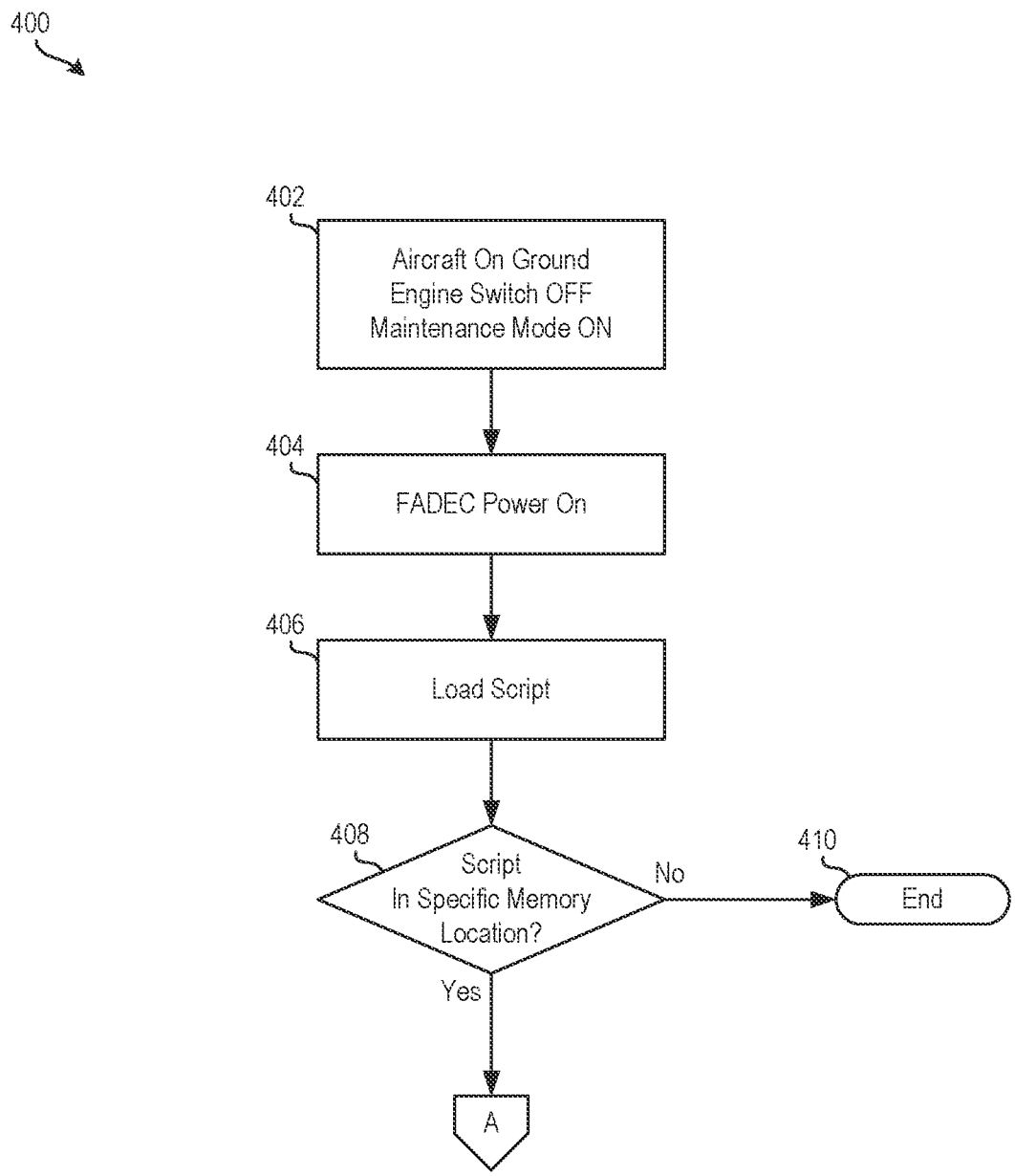
FIGS. 4A and 4B together are a flow diagram of a method for aircraft d according to one or more embodiments described herein.
Figure 4B:
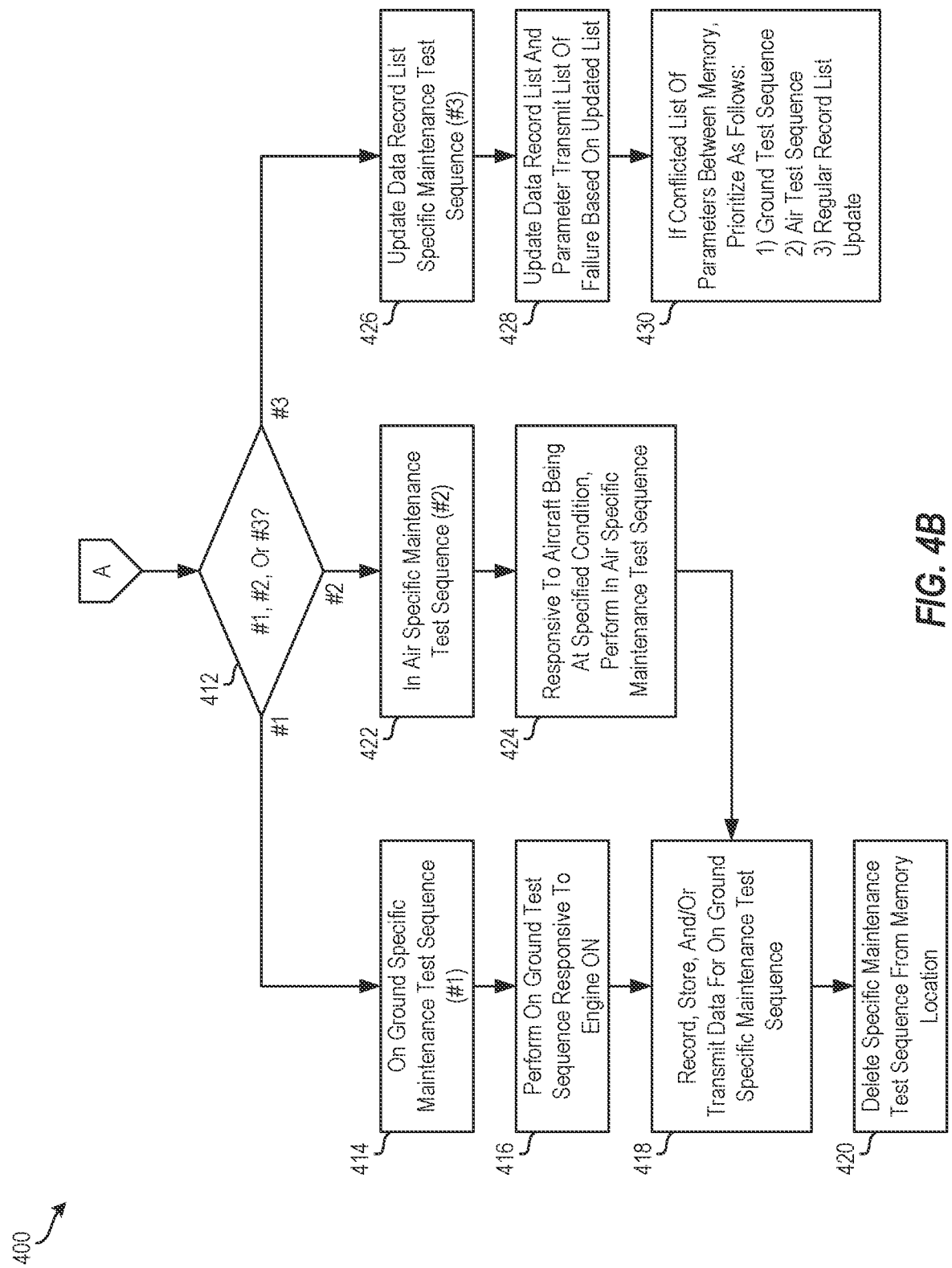

If, however, it is determined at block 408 that a script is stored in a specific memory location, the method 400 proceeds to block 410 (see FIG. 4B).

At block 412, the FADEC 300 determines to which specific memory location the script is stored. For example, the FADEC 300 determines whether the script is stored in one or more of the specific maintenance test memory #1 location 311, the specific maintenance test memory #2 location 312, and/or the specific maintenance test memory #3 location 313.

If the FADEC 300 determines that the script is stored in the specific maintenance test memory #1 location 311 (associated with "on ground" test sequences), the method 400 proceeds to block 414. At block 414, the method 400 begins the on ground test sequence. At block 416, the FADEC 300 performs the on ground specific maintenance test sequence (#1) responsive to the engine being turned "on." At block 418, the FADEC 300 records, stores, and/or transmits data for the on ground test sequence. The data can be stored locally, such as on the FADEC 300, and/or transmitted to a remote processing system, such as another system of the aircraft (e.g., the aircraft maintenance computer 220) or a ground-based system (e.g., a processing system associated with a manufacturer/supplier of the gas turbine engine 20). At block 420, the FADEC 300 deletes the specific maintenance test sequence (e.g., the on ground specific maintenance test sequence) from the specific maintenance test memory #1 location 311.

If the FADEC 300 determines that the script is stored in the specific maintenance test memory #2 location 312 (associated with "in air" test sequences), the method 400 proceeds to block 422. At block 422, the method 400 begins the in air specific maintenance test sequence (#2). Responsive to the aircraft being at a specified condition (e.g., at a specified speed, altitude, configuration, and/or the like, including combinations and/or multiples thereof), the FADEC 300 performs the in air specific maintenance test sequence. The method 400 then proceeds to block 418, where the FADEC 300 records, stores, and/or transmits data for the on ground test sequence as described herein. At block 420, the FADEC 300 deletes the specific maintenance test sequence (e.g., the in air specific maintenance test sequence) from the specific maintenance test memory #2 location 311.

If the FADEC 300 determines that the script is stored in the specific maintenance test memory #3 location 313 (associated with "data record" test sequences), the method 400 proceeds to block 426. At block 426, the method 400 begins the update data record list specific maintenance test sequence. At block 428, the FADEC 300 updates the data record list (e.g., the data record list 304) and parameter transmit list (e.g., a list of parameters transmitted to a remote processing system) of failure based on any updated list. For example, the FADEC 300 updates the data record list 304 as specified in the specific maintenance test memory #3 location 313. This enables a technician/engineer to specify particular data of interest to be recorded. The data record list 304 is updated to record the particular data of interest specified in the specific maintenance test memory #3 location 313. At block 430, the FADEC 300 detects a conflicted list of parameters between memory. The FADEC 300 can prioritize the conflicts. One example of prioritizing the conflicts is as follows: first priority is a ground test sequence, second priority is an in air test sequence, and third priority is the regular record list update. It should be appreciated that these (or other) options can be prioritized in other orders, and this is merely an example.

It should be appreciated that one or more embodiments described herein provide for improving the functioning of aircraft and thus improve aircraft technology. For example, the techniques described herein provide for loading and performing custom test sequences beyond the maintenance test sequences included in the originally implemented FADEC and gas turbine engine. This provides for improved issue detection and troubleshooting (such as through targeted data collection). One or more embodiments described herein also provide for correcting detected issues by implementing corrective actions directed to correcting the issues. For example, if a fault occurs, but the source of the fault is unknown, additional data can be recorded to help detect the cause of the fault. As an example, if a vibration-related fault is observed to have occurred, but vibration data is not available, a script can be loaded to the FADEC to cause the FADEC to record vibration information/data, which can be used to isolate the cause of the fault and implement a corrective action targeted to correct the vibration-related fault.

Additional processes also may be included, and it should be understood that the process depicted in FIGS. 4A and 4B represents an illustration, and that other processes may be added or existing processes may be removed, modified, or rearranged without departing from the scope of the present disclosure.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method for aircraft engine maintenance testing for an engine of an aircraft, the method comprising:
   causing, by an aircraft maintenance computer, a full authority digital engine control to enter a test mode;
   loading, via the aircraft maintenance computer, a script to the full authority digital engine control, the script defining a specific maintenance test sequence;
   performing, by the full authority digital engine control, the specific maintenance test sequence; and
   implementing a corrective action to correct a defect detected by the specific maintenance test sequence.

2. The method of claim 1, wherein the specific maintenance test sequence is an on ground specific maintenance test sequence.

3. The method of claim 2, wherein performing the on ground specific maintenance test sequence comprises:
   performing the on ground specific maintenance test sequence responsive to an engine on event;
   recording, storing, and transmitting data for the on ground specific maintenance test sequence; and
   deleting the on ground specific maintenance test sequence subsequent to performing the on ground specific maintenance test sequence.

4. The method of claim 1, wherein the specific maintenance test sequence is an in air specific maintenance test sequence.

5. The method of claim 4, wherein performing the in air specific maintenance test sequence comprises:
   performing the in air specific maintenance test sequence responsive to the aircraft being at a specified condition;
   recording, storing, and transmitting data for the in air specific maintenance test sequence; and
   deleting the on ground specific maintenance test sequence subsequent to performing the in air specific maintenance test sequence.

6. The method of claim 1, wherein the specific maintenance test sequence is an update data record list specific maintenance test sequence.

7. The method of claim 6, wherein performing the update data record list specific maintenance test sequence comprises updating a data record list and a parameter transmit list.

8. The method of claim 1, wherein performing, by the full authority digital engine control, the specific maintenance test sequence is based at least in part on a location within a memory in which the specific maintenance test sequence is stored.

9. The method of claim 1, wherein the engine is a gas turbine engine.

10. A full authority digital engine control comprising:
    a memory comprising computer readable instructions; and
    a processing device for executing the computer readable instructions, the computer readable instructions controlling the processing device to perform operations for aircraft engine maintenance testing for an engine of an aircraft, the operations comprising:
      entering a test mode responsive to a command from an aircraft maintenance computer;
      loading, via the aircraft maintenance computer, a script to the memory, the script defining a specific maintenance test sequence;
      performing the specific maintenance test sequence; and
      causing a corrective action to be implemented to correct a defect detected by the specific maintenance test sequence.

11. The full authority digital engine control of claim 10, wherein the specific maintenance test sequence is an on ground specific maintenance test sequence.

12. The full authority digital engine control of claim 11, wherein performing the on ground specific maintenance test sequence comprises:
    performing the on ground specific maintenance test sequence responsive to an engine on event;
    recording, storing, and transmitting data for the on ground specific maintenance test sequence; and
    deleting the on ground specific maintenance test sequence subsequent to performing the on ground specific maintenance test sequence.

13. The full authority digital engine control of claim 10, wherein the specific maintenance test sequence is an in air specific maintenance test sequence.

14. The full authority digital engine control of claim 13, wherein performing the in air specific maintenance test sequence comprises:
    performing the in air specific maintenance test sequence responsive to the aircraft being at a specified condition;
    recording, storing, and transmitting data for the in air specific maintenance test sequence; and
    deleting the on ground specific maintenance test sequence subsequent to performing the in air specific maintenance test sequence.

15. The full authority digital engine control of claim 10, wherein the specific maintenance test sequence is an update data record list specific maintenance test sequence, and wherein performing the update data record list specific maintenance test sequence comprises updating a data record list and a parameter transmit list.

16. The full authority digital engine control of claim 10, wherein the script comprises a data field that defines a condition of the aircraft under which the script can be executed, wherein the operations further comprise, prior to loading the script to the memory, comparing the condition defined in the data field against an actual condition of the aircraft, and wherein the script is loaded to the memory responsive to determining that the actual condition of the aircraft satisfies the condition defined in the data field.

17. The full authority digital engine control of claim 10, wherein performing the specific maintenance test sequence is based at least in part on a location within the memory in which the specific maintenance test sequence is stored.

18. The full authority digital engine control of claim 10, wherein the engine is a gas turbine engine.

19. A computer program product comprising a computer readable storage medium having program instructions embodied therewith, the program instructions executable by a processor to cause the processor to perform operations for aircraft engine maintenance testing for an engine of an aircraft, the operation comprising:
   causing, by an aircraft maintenance computer, a full authority digital engine control to enter a test mode;
   loading, via the aircraft maintenance computer, a script to a full authority digital engine control, the script defining a specific maintenance test sequence;
   performing, by the full authority digital engine control, the specific maintenance test sequence; and
   implementing a corrective action to correct a defect detected by the specific maintenance test sequence.

20. The computer program product of claim 19, wherein performing, by the full authority digital engine control, the specific maintenance test sequence is based at least in part on a location within a memory in which the specific maintenance test sequence is stored.

* * * * *